I. N. CONDRA.
Horse Hay-Rake.

No. 111,320.  Patented Jan. 31, 1871.

WITNESSES:  
Platt R. Richards  
H. B. Bergen.

INVENTOR:  
Isaac N. Condra  
By W. D. Richards  
his Atty.

United States Patent Office.

ISAAC N. CONDRA, OF GENOA, IOWA.

Letters Patent No. 111,320, dated January 31, 1871.

IMPROVEMENT IN HORSE HAY-RAKES.

The Schedule referred to in these Letters Patent and making part of the same.

I, ISAAC N. CONDRA, of Genoa, in the county of Wayne and State of Iowa, have invented certain Improvements in Revolving Hay-Rakes, of which the following is a specification.

Nature and Objects of the Invention.

The nature of my invention relates to improvements in revolving horse-rakes; and The invention consists in means for operating the rake by a handle provided with a notched plate and spring, all as hereinafter fully described.

Description of the Accompanying Drawing.

Figure 2:
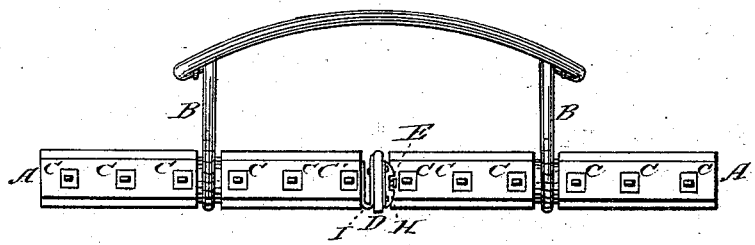
Figure 1:
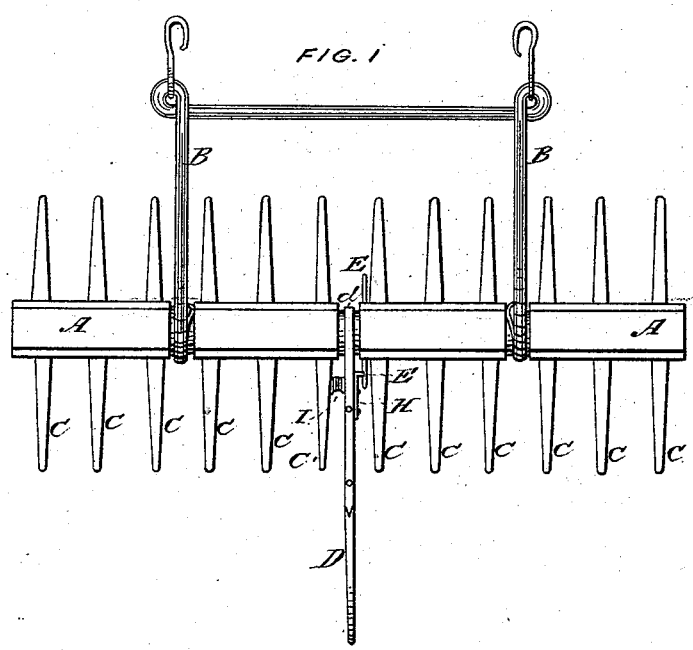

Figure 1 is a top plan or view of my invention.
Figure 2 is a view from the rear, or rear elevation.

General Description.

A is the rake-head.

B B are the draft-bars, extending forward and connected at their forward ends. They are formed of round iron, and at the angles or turns forward are so bent as to form eyes, into which the hooks for hitching the horses thereto may be attached. At their rear ends the said draft-bars encircle the rake-head A on suitable journals.

C C C are the rake-teeth, extending through the head A, and pointed in the usual method of revolving rakes.

D is the handle, from which a strap, $d$, encircles the head A on a suitable journal, allowing the head A to revolve while the handle is held stationary.

E E are tongues or catches, extending out from the rake-head A at the side of the handle D.

H is a plate attached to the handle D, as shown and provided with a notch, corresponding to the size of the cross-sections of tongues E E.

I is a spring attached to the handle D on its opposite side from the plate or catch H.

Operation.

The operation of my invention is as follows:

The spring I, impinging against the rake-tooth C', will press the handle D to the right, and the catch-plate H will engage the tongue E and prevent the rake from revolving. When it is desired to revolve the rake and discharge its contents, it can be done by simply pressing the handle D to the left, when the notch in the plate H will become disengaged from the tongue E, and the load on the forward teeth bringing their points to the ground, the forward motion of the team will revolve the rake. When revolved, the tongue E on the opposite side will become engaged with plate H, and it is again ready for loading.

Claim.

I claim as my invention—

The handle D secured to the rake-head A by strap, $d$, provided with the notched plate H and spring I, in combination with the tongues E and adjacent rake-teeth C', all combined and arranged to operate substantially as described.

ISAAC N. CONDRA.

Witnesses:
A. S. FEEKALY,
HENRY STOCKTON.